United States Patent [19]
Olsen et al.

[11] Patent Number: 5,857,893
[45] Date of Patent: *Jan. 12, 1999

[54] METHODS AND APPARATUS FOR MEASURING AND DISPENSING PROCESSING SOLUTIONS TO A CMP MACHINE

[75] Inventors: Gregory A. Olsen, Tempe; Carey R. Smith, Phoenix, both of Ariz.; Wayne Pratt, Millville, N.J.

[73] Assignee: Speedfam Corporation, Chandler, Ariz.

[*] Notice: This patent issued on a continued prosecution application filed under 37 CFR 1.53(d), and is subject to the twenty year patent term provisions of 35 U.S.C. 154(a)(2).

[21] Appl. No.: 720,744

[22] Filed: Oct. 2, 1996

[51] Int. Cl.$^6$ .................................................. B24B 49/16
[52] U.S. Cl. .............................. 451/5; 451/60; 451/285; 451/286; 451/287; 451/446; 222/63
[58] Field of Search .............................. 451/60, 285–290, 451/446, 5; 222/63, 71

[56] References Cited

U.S. PATENT DOCUMENTS

| | | |
|---|---|---|
| 4,059,929 | 11/1977 | Bishop . |
| 4,513,894 | 4/1985 | Doyle et al. ............................ 451/446 |
| 4,716,771 | 1/1988 | Kane . |
| 4,733,569 | 3/1988 | Kelsey et al. . |
| 5,054,650 | 10/1991 | Price ........................................ 222/71 |
| 5,423,221 | 6/1995 | Kane et al. . |
| 5,433,432 | 7/1995 | Luro ........................................ 222/71 |
| 5,433,650 | 7/1995 | Winebarger ............................ 451/287 |
| 5,498,196 | 3/1996 | Karlsrud et al. ........................ 451/287 |
| 5,551,307 | 9/1996 | Kane et al. . |
| 5,575,706 | 11/1996 | Tsai et al. ............................... 451/285 |
| 5,700,180 | 12/1997 | Sandhu et al. ............................. 451/5 |

FOREIGN PATENT DOCUMENTS

| | | |
|---|---|---|
| 0 253 504 A1 | 1/1988 | European Pat. Off. . |
| 0 709 166 A1 | 5/1996 | European Pat. Off. . |
| WO 93 19348 A | 9/1993 | WIPO . |

OTHER PUBLICATIONS

Fundamentals of Process Contro Theory by Paul W. Murrill, p. 59 and Table C–2 (p. 232), 1991.
IEEE Technical Paper In Situ Technique for Multi–Layer Interconnection, 1995.
Semco Corporation Slurry Mixing System, Apr. 1, 1997.

*Primary Examiner*—Robert A. Rose
*Assistant Examiner*—George Nguyen
*Attorney, Agent, or Firm*—Snell & Wilmer

[57] ABSTRACT

Methods and apparatus for measuring and controlling the flow rates of processing solutions to a CMP machine during the polishing and planarization process. The apparatus comprises a processing solution source, a processing solution dispensing system for applying the solution to the CMP machine, a mechanism for transferring the processing solution from the solution source to the dispensing system, and a metering or sensing system for accurately measuring the amount of processing solution actually dispensed to the CMP machine. Preferably, the metering system comprises a coriolis mass flow meter and a controller for controlling its operation. The metering system may interface with the CMP machine controller in a feed-back loop configuration so that the actual flow rates of the solutions may be controlled in real time.

11 Claims, 5 Drawing Sheets

METHODS AND APPARATUS FOR MEASURING AND DISPENSING PROCESSING SOLUTIONS TO A CMP MACHINE

TECHNICAL FIELD

The present invention relates, generally, to methods and apparatus for measuring and dispensing processing solution to a CMP machine and, more particularly, to an intelligent system which controls the dispensing of the processing solution to the CMP machine while monitoring the amount of solution actually dispensed to ensure accuracy of the system. The intelligent system can also change the amount of solution dispensed during the CMP process based on various parameters input into the system by an operator.

BACKGROUND ART AND TECHNICAL PROBLEMS

The production of integrated circuits begins with the creation of high-quality semiconductor wafers. During the wafer fabrication process, the wafers may undergo multiple masking, etching, and dielectric and conductor deposition processes. Because of the high-precision required in the production of these integrated circuits, an extremely flat surface is generally needed on at least one side of the semiconductor wafer to ensure proper accuracy and performance of the microelectronic structures being created on the wafer surface. As the size of the integrated circuits continues to decrease and the density of microstructures on an integrated circuit increases, the need for precise wafer surfaces becomes more important. Therefore, between each processing step, it is usually necessary to polish or planarize the surface of the wafer to obtain the flattest surface possible.

For a discussion of chemical mechanical planarization (CMP) processes and apparatus, see, for example, Arai, et al., U.S. Pat. No. 4,805,348, issued February, 1989; Arai, et al., U.S. Pat. No. 5,099,614, issued March, 1992; Karlsrud et al., U.S. Pat. No. 5,329,732, issued July, 1994; Karlsrud, U.S. Pat. No. 5,498,196, issued March, 1996; and Karlsrud et al., U.S. Pat. No. 5,498,199, issued March, 1996.

Such polishing is well known in the art and generally includes attaching one side of the wafer to a flat surface of a wafer carrier or chuck and pressing the other side of the wafer against a flat polishing surface. In general, the polishing surface comprises a horizontal polishing pad that has an exposed abrasive surface of, for example, cerium oxide, aluminum oxide, fumed/precipitated silica or other particulate abrasives. Polishing pads can be formed of various materials, as is known in the art, and which are available commercially. Typically, the polishing pad may be a blown polyurethane, such as the IC and GS series of polishing pads available from Rodel Products Corporation in Scottsdale, Ariz. The hardness and density of the polishing pad depends on the material that is to be polished.

During the polishing or planarization process, the workpiece or wafer is typically pressed against the polishing pad surface while the pad rotates about its vertical axis. In addition, to improve the polishing effectiveness, the wafer may also be rotated about its vertical axis and oscillated back and forth over the surface of the polishing pad.

Also, during the polishing of planarization process, a slurry solution is typically introduced onto the polishing surface, adding the chemical component to the chemical mechanical planarization ("CMP") process. Various different types of slurry solutions may be used to polish the semiconductor wafers, most of which are available commercially from various sources, such as, for example, Rodel, and Cabot. The type of slurry used generally depends on the material layer of the wafer being polished. For example, one type of slurry may be used to polish a bare silica surface of a wafer, while other types of slurries may be used to polish an oxide dielectric layer or a metal conductor layer. Moreover, deionized water is very often introduced into the system for cleaning purposes.

One of the more costly aspects of the wafer polishing process surrounds the consumption and disposal of the slurry compounds and the deionized water. It is therefore advantageous to precisely monitor and control the amount of slurry and deionized water used during the semiconductor wafer fabrication process. However, given the nature of the slurry compounds, no device to date has been found that accurately and clearly measures slurry flow. For example, standard flywheel and rotor type meters are inadequate because the fine abrasive particles in the slurry solutions tend to damage and jam the mechanical components of those meters. In addition, as the abrasive particles wear on the mechanical components of the meters, particulates worn from the components can contaminate the slurry, causing extreme damage to the wafers. Therefore, a noncontacting fluid sensing device is considered desirable.

Various types of noncontacting fluid sensing devices are generally known in the art, including electromagnetic flow meters, ultrasonic flow meters, thermal dispersion flow detectors and meters, vortex shedding meters, and rotameters with Hall effect electronic transducers, to name a few. However, most are inadequate for measuring the slurry flows in a CMP environment.

Electromagnetic flow meters are typically used in the mining industry to detect the large slurry flows used in that industry. As such, the electromagnetic flow meters are generally too large to be used with the CMP machines. Ultrasonic flow meters, like electromagnetic meters, are also too large for practical use with CMP machines. In addition, ultrasonic flow meters need to be fully charged with fluid in order to operate. This condition greatly affects the accuracy of the meter at the beginning and end of slurry flow cycles. Thermal dispersion flow detectors and meters have very slow response times, typically fifteen to twenty-five seconds; this is far too slow to accurately measure slurry flow rates in CMP machines. In addition, thermal dispersion flow detectors and meters are ineffective when used to detect the low slurry flow amounts that exist in CMP machines. Similarly, the vortex shedding meters also cannot adequately detect the low flow ranges of the CMP machines. Finally, the rotameters with Hall effect electronic transducers are inadequate because the meter's electronics are unstable, and the meter's sensors are ultra-sensitive to any metallic object they come in contact with. For example, the sensor can waiver up to ten percent (10%) when a metal object passes close to it. This condition is totally inadequate for use on a CMP machine where metal parts are prevalent.

A system is thus needed which accurately measures the flow rates of slurry and deionized water to the CMP machine and controls the flow rate during the CMP process which overcomes the shortcomings of the prior art.

SUMMARY OF THE INVENTION

The present invention provides methods and apparatus for measuring the flow rates of processing solutions to a CMP machine and for monitoring and controlling the solution flows during the polishing and planarization process.

In accordance with one aspect of the present invention, apparatus and methods are presented which permit the control of the flow rates of processing solutions to a CMP machine during the polishing and planarization process, and which accurately measure the actual flow rates to the CMP machine to ensure that the actual flow rates are within an allowable tolerance range of desired flow rates. In accordance with a preferred embodiment of the present invention, an apparatus for dispensing the processing solution to a CMP polishing machine generally comprises a processing solution source, a processing solution dispensing system for applying the solution to the CMP machine, a mechanism for transferring this processing solution from the solution source to the dispensing system, and a metering or sensing system for accurately measuring the amount of processing solution actually dispensed to the CMP machine.

In accordance with one aspect of the present invention, an exemplary sensing system suitably comprises a meter for measuring the amount of processing solution dispensed to the machine and a controller for controlling the operation of the meter. The controller can be any type of electronic controller, for example a stand-alone PC computer or the CMP polishing machine's computer control system.

In accordance with a further aspect of the present invention, the meter may comprise a suitable sensor coupled to a transmitter which facilitates communication between the flow meter and the controller. The transmitter may be configured in any way to suitably communicate with the controller; for example, the transmitter may be hard wired to the controller or may communication with the controller via RF transmissions.

In accordance with yet a further aspect of the present invention, the transferring mechanism may comprise any suitable apparatus that will adequately transport the solution from the solution source to the dispensing system; for example, any suitable pumping device.

In accordance with yet another aspect of the present invention, the system may be configured to control the pumping device so that a desired amount of solution is dispensed to the CMP machine during the polishing process. In a preferred embodiment, either the controller or the meter's transmitter may be configured to communicate the proper control signals to the pumping device.

In accordance with yet another aspect of the present invention, the controller may be configured to sound an alarm and stop the polishing process if the measured flow rate of the processing solution is outside an allowable tolerance range of the desired flow rate.

In accordance with yet a further aspect of the present invention, the meter used to measure the flow rate of the processing solution suitably comprises a coriolis mass flow meter which measures the mass flow rate and total amount of solution dispensed over time. Also, the coriolis mass flow meter can measure the density of the solution being dispensed. In accordance with this aspect of the present invention, the controller may be configured to sound an alarm and/or stop the polishing process if the measured density of the processing solution is different than the standard density for the type of processing solution being used. That is, by measuring and calculating the density of the processing solution, the mass flow meter can detect whether the proper processing solution is being used for a given processing step. If not, the system may be configured to shut down.

BRIEF DESCRIPTION OF THE DRAWING FIGURES

The present invention will hereinafter be described in conjunction with the appended drawing figures, wherein like numerals denote like elements, and:

DETAILED DESCRIPTION OF PREFERRED EXEMPLARY EMBODIMENTS

The subject invention relates to the measurement and control of the flow of processing solution to a machine for processing workpieces, for example a chemical mechanical planarization CMP machine, during the polishing or planarization of semiconductor wafer workpieces. The preferred embodiment set forth herein utilizes a coriolis mass flow meter to accurately measure the actual flow of processing solution to the CMP machine. It will be appreciated, however, that other types of meters may be utilized.

Figure 1:
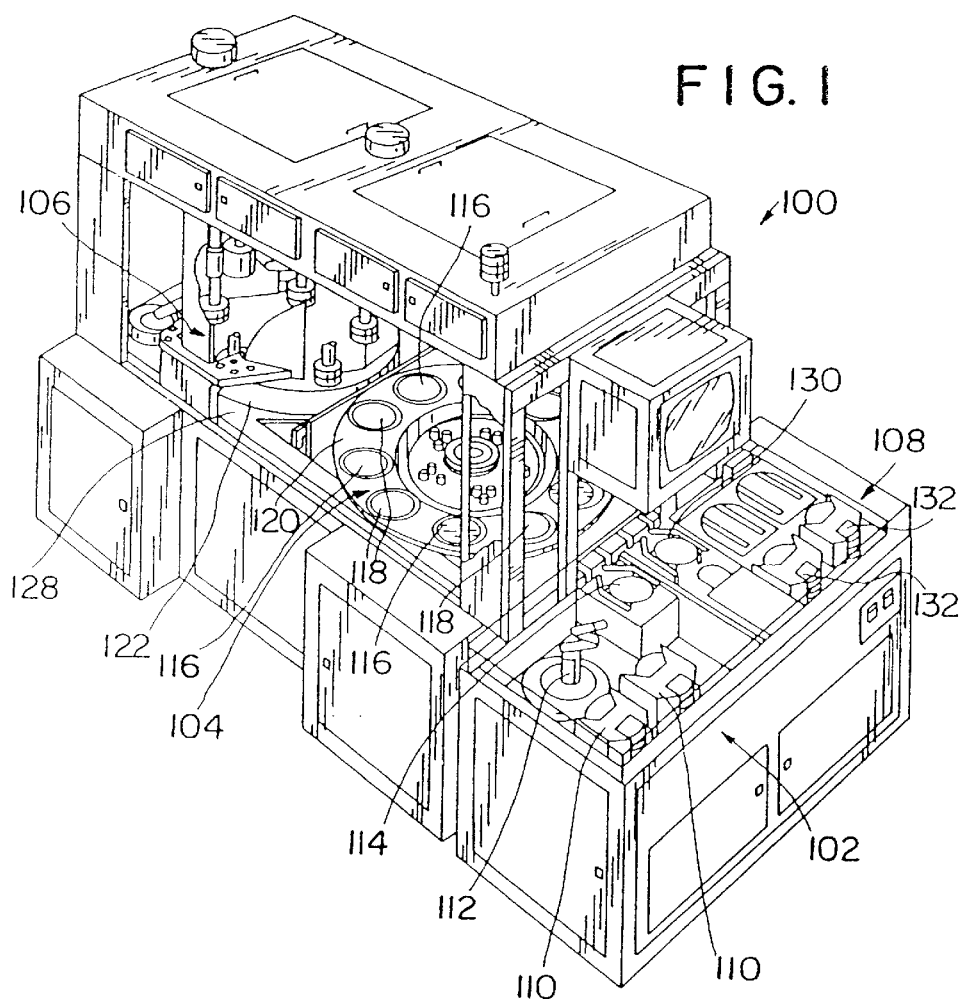
FIG. 1 is a perspective view of an exemplary CMP machine upon which the processing solution measuring and dispensing system of the present invention is suitably installed.
Figure 2:
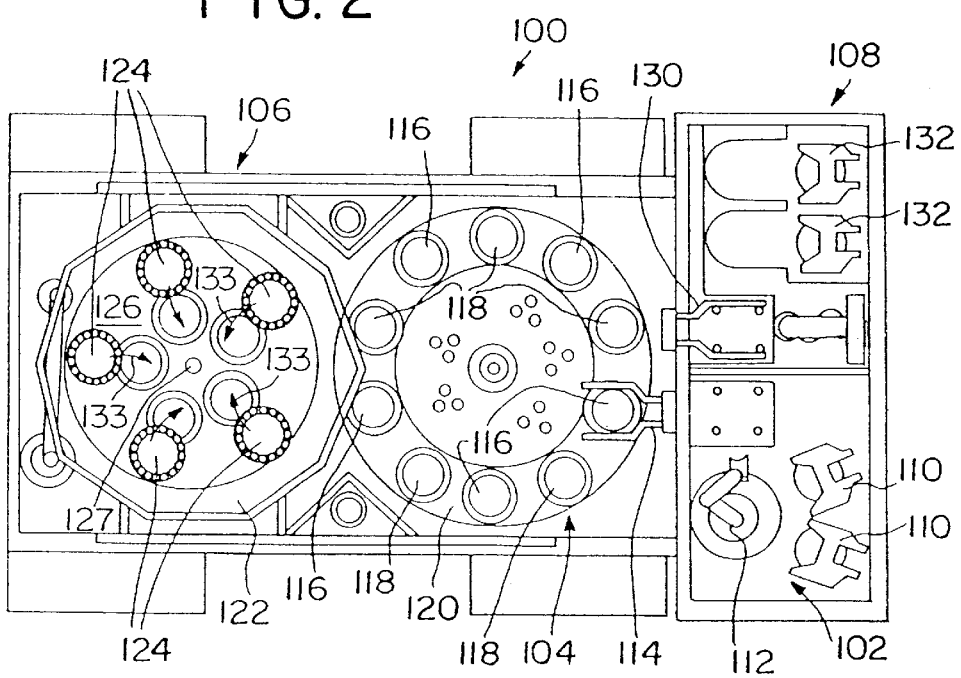
FIG. 2 is a top view of the CMP machine of FIG. 1.

Referring now to FIGS. 1–2, a wafer polishing apparatus 100 is shown embodying the present invention. Wafer polishing apparatus 100 suitably comprises a multiple head wafer polishing machine which accepts wafers from a previous processing step, polishes and rinses the wafers, and reloads the wafers back into wafer cassettes for subsequent processing. Discssing now the polishing apparatus 100 in more detail, apparatus 100 comprises an unload station 102, a wafer transition station 104, a polishing station 106, and a wafer rinse and load station 108.

In accordance with a preferred embodiment of the invention, cassettes 110, each holding a plurality of wafers, are loaded into the machine at unload station 102. Next, a robotic wafer carrier arm 112 removes the wafers from cassettes 110 and places them, one at a time, on a first wafer transfer arm 114. Wafer transfer arm 114 then sequentially lifts and moves each wafer into wafer transition section 104. That is, transfer arm 114 suitably places an individual wafer on one of a plurality of wafer pick-up stations 116 which reside on a rotatable table 120 within wafer transition section 104. Rotatable table 120 also suitably includes a plurality of wafer drop-off stations 118 which alternate with pick-up stations 116. After a wafer is deposited on one of the plurality of pick-up stations 116, table 120 rotates so that a new station 116 aligns with transfer arm 114. Transfer arm 114 then places the next wafer on the new empty pick-up station 116. This process continues until all pick-up stations 116 are filled with wafers. In the illustrated embodiment of the invention, table 120 includes five pick-up stations 116 and five drop-off stations 118.

Next, a multi-head wafer transport apparatus 122, comprising individual wafer carrier elements 124, suitably aligns itself over table 120 so that respective carrier elements 124 are positioned directly above the wafers which reside in respective pick-up stations 116. The multi-head transport apparatus 122 then drops down and picks up the wafers from their respective stations and moves the wafers laterally such that the wafers are positioned above polishing station 106. Once above polishing station 106, transport apparatus 122 suitably lowers the wafers, which are held by individual elements 124, into operative engagement with a polishing pad 126 which sits atop a lap wheel 128. During operation, lap wheel 128 causes polishing pad 126 to rotate about its vertical axis. At the same time, individual carrier elements 124 spin the wafers about their respective vertical axes and oscillate the wafers back and forth across pad 126 (substantially along arrow 133) as they press against the polishing pad. Further, a processing solution dispensing apparatus 127 will dispense slurry onto polishing pad 126, to further facilitate the CMP polishing process. In this manner, the under surface of the wafer is polished or planarized.

After an appropriate period of time, the wafers are removed from polishing pad 126, and multi-head transport apparatus 122 transports the wafers back to transition station 104. Transport apparatus 122 then lowers individual carrier elements 124 and deposits the wafers onto drop-off stations 118. The wafers are then removed from drop-off stations 118 by a second transfer arm 130. Transfer arm 130 suitably lifts each wafer out of transition station 104 and transfers them into wafer rinse and load station 108. In the load station 108, transfer arm 130 holds the wafers while they are rinsed. After a thorough rinsing, the wafers are reloaded into cassettes 132, which then transports the subsequent stations for further processing or packaging.

Although CMP machine 100 is shown having five carrier elements 124, it will be appreciated that the present invention may be employed in the context of virtually any number of carrier elements. Moreover, the present invention may also be employed in circumstances where not all of the carrier elements 124 are functioning at a time.

Figure 3:
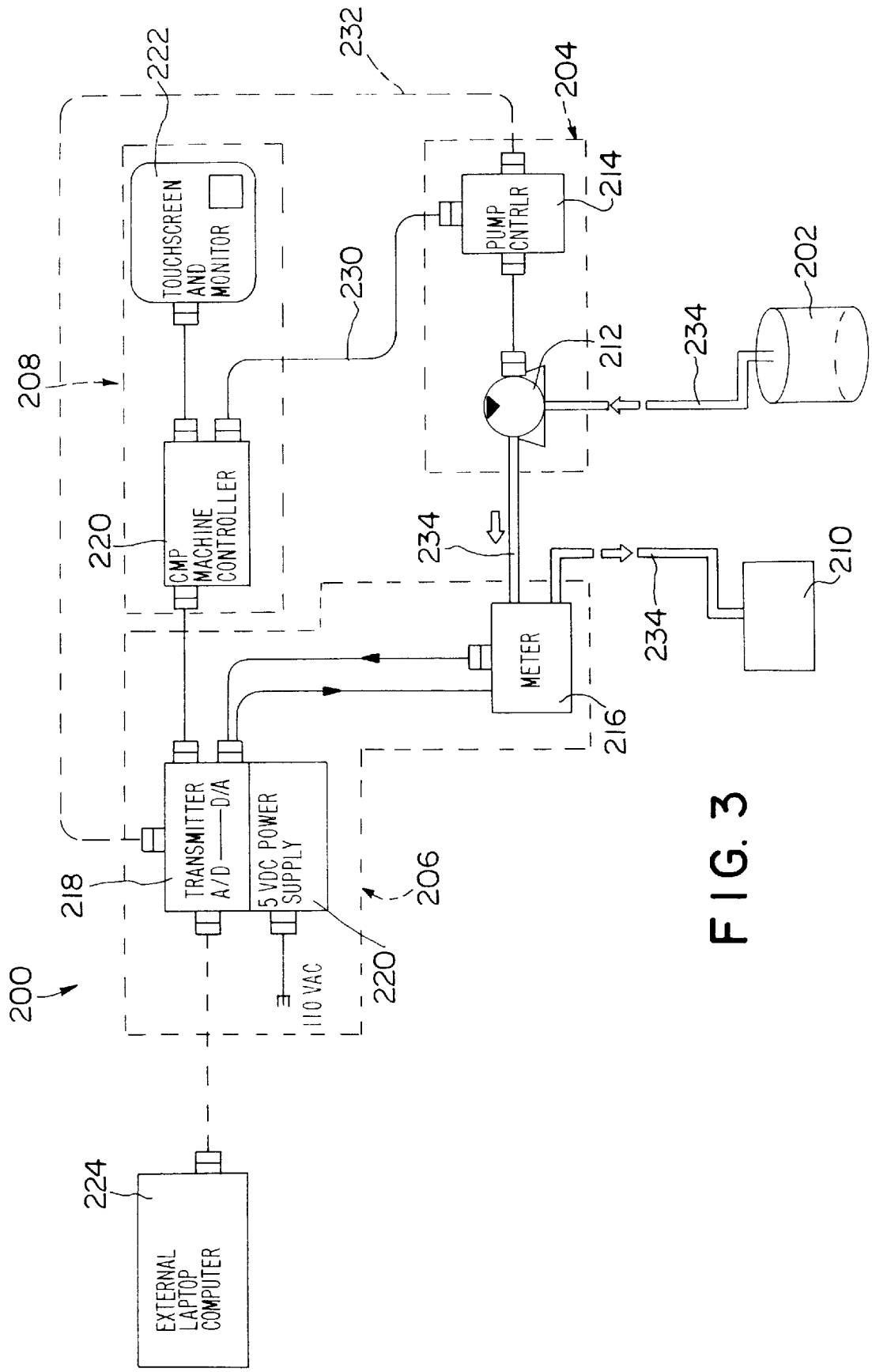
FIG. 3 is a system schematic drawing of an exemplary embodiment of the measuring and dispensing system of the present invention.

Referring now to FIG. 3, a processing solution dispensing and measurement system 200 will now be discussed in greater detail. In accordance with a preferred embodiment of the present invention, dispensing and measurement system 200 suitably comprises a processing solution source 202, a pumping system 204, a processing solution metering system 206, a controller 208, and a processing solution dispensing system 210.

Pumping system 204 may comprise any suitable means for transferring solution from solution source 202 to measurement system 206, such as, for example, any suitable pump or fluid transfer system. In accordance with the illustrated embodiment, pumping system 204 suitably comprises a pump 212 and a pump controller 214 suitably configured to communicate with and control pump 212.

Processing solution metering system 206 suitably comprises a noncontacting fluid flow meter or sensor 216 and a transmitter assembly 218 electrically coupled to sensor 216. Sensor 216 and transmitter 218 are powered by a power supply 220. To conserve space on the CMP machine, transmitter 218 is typically located remotely from meter 216. However, in accordance with an alternative embodiment of the invention, transmitter 218 and sensor 216 may be housed together in the same hardware device.

Transmitter 218 is suitably configured to communicate with a system controller 208. In accordance with a preferred embodiment of the invention, system controller 208 suitably comprises the CMP machine's system control computer 220 configured to control the entire processing operation of the CMP machine. In accordance with this aspect of the present invention, system control computer 220 includes a control monitor 222 which functions as the input/output device for computer controller 220. It should be noted however, that control computer 220 may include various other I/O devices, such as, for example, a keyboard, CD-Rom or disk drive, a printer device, and the like. Further, transmitter 218 may be hard-wired to controller 220 or, alternatively, they may communicate via RF transmissions.

In accordance with an alternate embodiment of the present invention, processing solution dispensing system 200 may be controlled separately from the CMP machine. That is, instead of communicating with the CMP machine system control computer 220, transmitter 218 may be configured to communicate with an external computer controller 224. External computer controller 224 may comprise any suitable PC computer loaded with software capable of controlling measurement system 206 and pumping system 204; for example, the Screwdriver Software available from ABB K-Flow, Inc. of Millville, N.J. In addition, computer controller 224 may connect with an external monitor to allow an operator to observe the operation of the dispensing and measurement system 200. As with the CMP machine's control computer 220, external computer controller 224 may be hard-wired to transmitter 218, or it may communicate with transmitter 218 via RF transmissions.

Still referring to FIG. 3, the operation of processing solution dispensing and measurement system 200 will now be discussed in greater detail. During the wafer planarization and polishing process, it is important to control the type and amount of slurry provided to the polishing pad surface. Typically, small amounts of slurry are consistently provided to the polishing pad surface throughout the polishing process. However, factors such as the type and amount of material being removed from the workpiece surfaces, the velocities of the polishing pad and the individual carrier elements, and the pressure applied by the carrier elements to the wafers during the polishing process, may affect the desired flow rate of the slurry to the polishing pad. Therefore, it is important to be able to control and adjust the amount of slurry provided to the polishing surface in real time throughout the polishing process.

In accordance with a particularly preferred embodiment of the present invention, control system 208 is suitably programmed to control the amount of slurry dispensed to the polishing surface throughout the polishing process. If, based on the factors mentioned above, the controller determines that more or less slurry is needed for the polishing process, the controller may send a signal to the pump, directing the pump to change the pumping rate accordingly. In this manner, CMP control computer 220 is configured to communicate directly with pump controller 214 via a communication line 230. Alternatively, CMP control computer 220 may communicate with pump controller 214 indirectly through transmitter 218. That is, in accordance with this alternative embodiment, control computer 220 sends a control signal to transmitter 218 which, in turn, transmits that signal to pump controller 214 via communication line 232. By communicating with pump controller 214 via transmitter 218, connection 230 can be eliminated, thus freeing-up an I/O port on control computer 220.

Upon receiving the signal from control computer 220, pump controller 214 operates pump 212, which transfers processing solution from solution source 202 to dispensing system 210 at the specified rate. The processing solution flows from solution source 202, through pump 212 and sensor 216, and out dispensing system 210. Solution source 202, pump 212, sensor 216 and dispensing system 210 are all connected by a suitable fluid ducting system 234; for example, suitable plastic tubing. As the solution passes through sensor 216, the sensor determines the actual flow rate of the solution to the polishing surface. The sensor then transmits an electrical signal indicative of the actual flow rate to transmitter 218. The transmitter in turn communicates that signal to system control computer 220. System control computer 220 then receives and analyzes the signal from sensor 216 and determines whether the actual flow rate of the processing solution is within an allowable tolerance range of the specified flow rate initially communicated to the pump controller from control computer 220. If the actual flow rate is within the allowable tolerance range, control computer 220 continues to operate the pump within the then current flow range. If the actual flow rate is outside the allowable tolerance range, the control computer sounds an alarm, shuts down the CMP machine, or initiates other appropriate action.

In accordance with a further aspect of the invention, if control computer 220 determines that more or less processing solution is needed, the computer may increase and/or decrease the flow of the solution to the dispensing station accordingly, and the measuring system will monitor the new flow rate to ensure its accuracy. For example, control 220 may be programmed to monitor certain dynamic parameters of the CMP machine, such as, for example, the down force applied to the individual wafers by the carrier elements, the rotation speeds of the polishing pad and carrier elements, and the vibration frequencies and intensities of the carrier elements and the multi-head assembly, to name a few. Based on these dynamically changing parameters, control computer 220 will determine an optimal fluid flow rate for the given conditions and will send signals to the pumping system, dynamically changing the flow rate virtually instantaneously with the changing processing conditions. In this manner, a complete feedback loop is established with pumping system 204, measuring or sensing system 206 and control system 208. In a preferred embodiment, various closed loop control algorithms may be employed, using either a proportional, proportional integral, or proportional integral derivative control scheme.

In accordance with a preferred embodiment of the present invention, sensor 216 may be any type of noncontacting fluid flow measuring device. However, in accordance with the preferred embodiment, sensor 216 is preferably a coriolis mass flow meter, for example, a K-Flow Coriolis Mass Meter, part no. K25 available from ABB K-Flow, Inc. of Millville, N.J.

Figure 4:
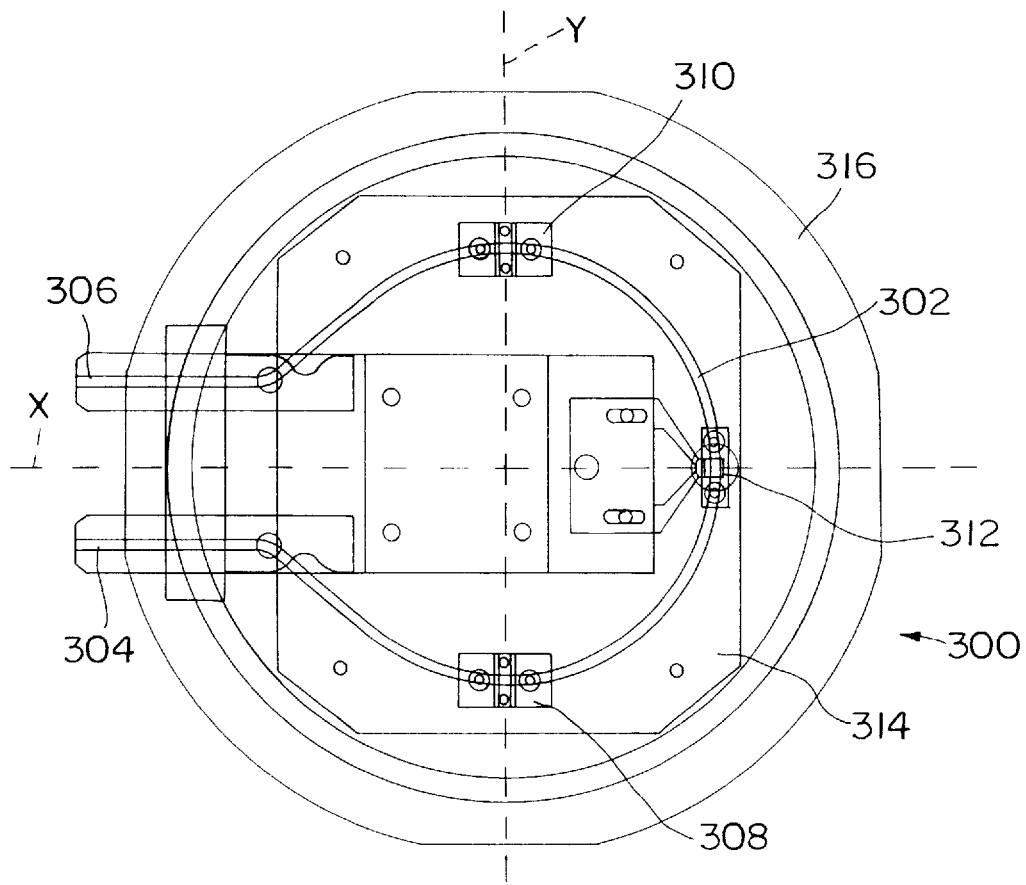
FIG. 4 is a top view of a coriolis mass flow meter as embodied in the present invention.

Referring now to FIG. 4, an exemplary embodiment of a coriolis mass flow meter or sensor 300 will now be discussed. Coriolis sensor 300 suitably comprises a processing solution conduit loop 302 having an inlet end 304 and an outlet end 306. Conduit loop 302 passes through and communicates with a first driving transducer 308, a second driving transducer 310, and a sensing transducer 312. First and second driving transducers 308, 310, and sensing transducer 312 are suitably mounted to a mounting plate 314. Further, conduit loop 302, first and second driving transducers 308, 310, sensing transducer 312, and mounting plate 314 are suitably encased in a protective housing 316 preferably evidencing a cylindrical configuration.

Figure 5:
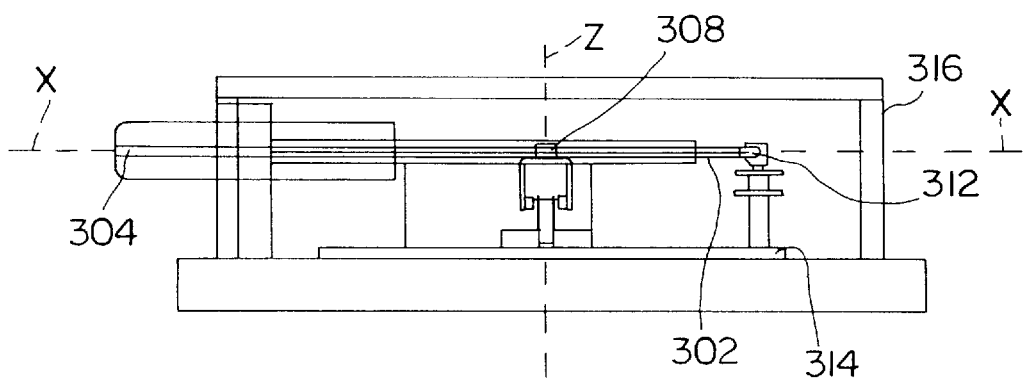
FIG. 5 is a side elevational view of the coriolis mass flow meter of FIG. 4.

During operation of coriolis sensor 300, the processing solution enters the sensor through inlet end 304, passes through conduit loop 312, and out outlet end 306. As the solution passes through conduit loop 312, driving transducers 308, 310 cause the conduit loop to oscillate in a direction perpendicular to the flow of the processing fluid through the loop; i.e. along the Z-axis shown in FIG. 5. The oscillation of the loop 302 imparts an alternating transverse acceleration to the solution as it passes through the loop. This acceleration creates a deflection of the loop in one direction along the Z-axis and then another deflection in the reverse direction. Sensing transducer 312 is preferably positioned at a point where maximum deflection of the loop occurs; i.e. at the far end of the loop along the X axis (see FIG. 4). The deflection of the loop is measured with respect to time and that measurement is used to calculate the mass flow of the solution through the loop. For a more detailed discussion of the configuration and operation of coriolis mass flow meters, see, for example, Kelsey et al., U.S. Pat. No. 4,733,569 issued Mar. 29, 1988, Kane, U.S. Pat. No. 4,716,771 issued Jan. 5, 1988, Kane et al., U.S. Pat. No. 5,423,221 issued Jun. 13, 1995, and Kane et al., U.S. Pat. No. 5,551,307 issued Sep. 3, 1996, all of which are incorporated herein by reference.

In accordance with a further aspect of the present invention, coriolis sensor 300 may also be configured to measure the temperature and/or density of the processing solution as it passes through the sensor. Accordingly, if the temperature or density of the solution measured by the sensor is outside an allowable tolerance range for that solution, the system will sound an alarm, stop processing, or initiate some other appropriate action.

Typically, several different types of slurries are used to polish the wafers during the wafer fabrication process. For example, one type of slurry may be used to polish a bare silicon wafer, whereas other slurries are used to polish an oxide dielectric layer or a metal conductor layer. Moreover, it is often desirable to dispense deionized water onto the polishing surface for cleaning and conditioning purposes. Therefore, the preferred embodiment of a CMP polishing machine is configured to dispense multiple types of slurry, deionized water and other suitable processing solutions without having to disconnect one solution type and connect another. That is, the preferred embodiment of the CMP processing machine is simultaneously connected to a plurality of different processing solution sources. In accordance with this aspect of the present invention, the CMP processing machine suitably comprises a plurality of solution sources, a plurality of pumping systems, and a plurality of flow measuring systems. Preferably, one controller is configured to control the operation of all pumping and measuring systems; however, a plurality of controllers can also be used.

Figure 6:
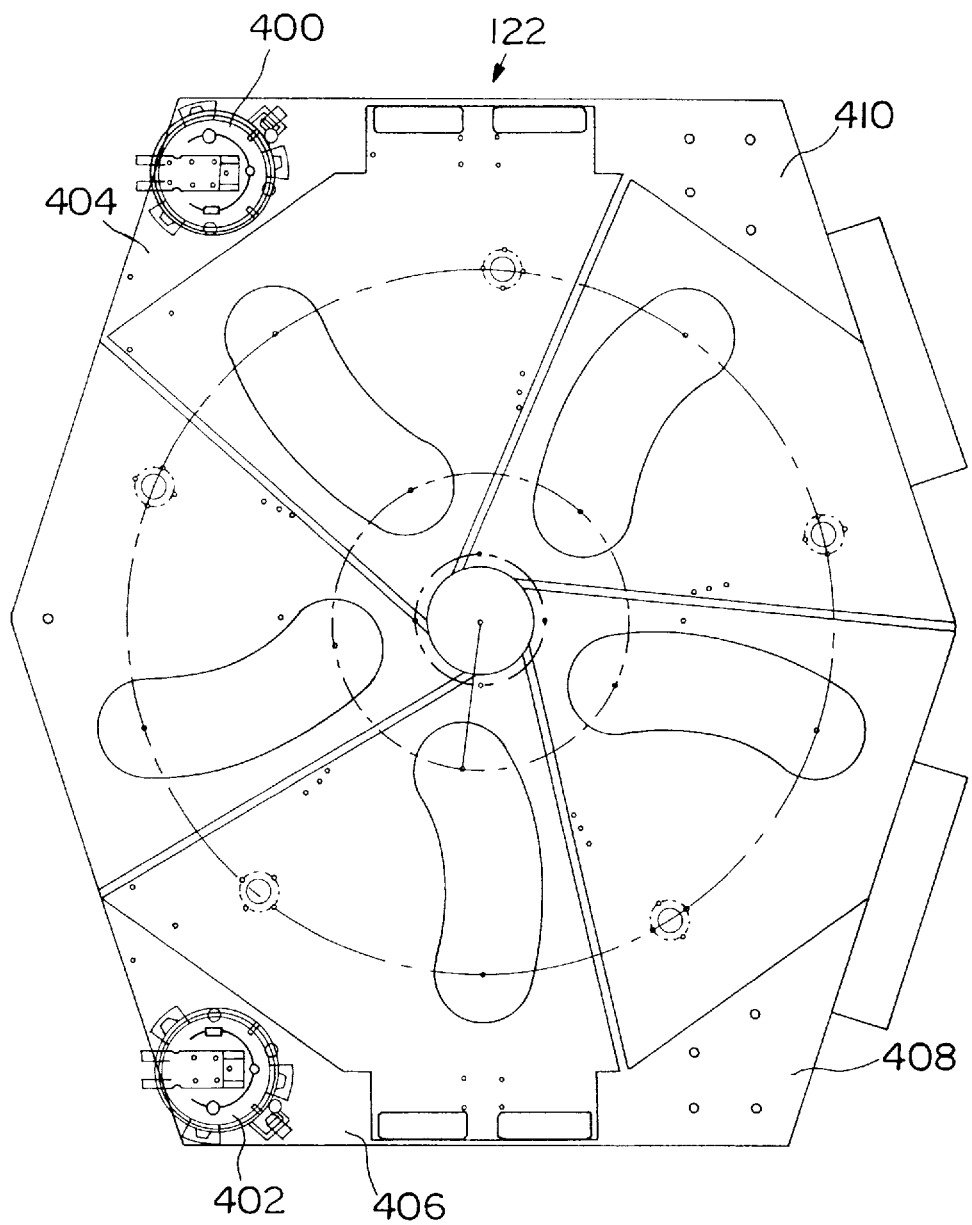
FIG. 6 is a top view of a multi-head transport facility of the CMP machine of FIG. 1 with the processing solution measuring devices attached to the top thereof.

Referring now to FIG. 6, a multi-head transport apparatus 122 is shown having two stacks of coriolis mass flow meters or sensors 400 attached to the top thereof. In accordance with the preferred embodiment of the invention, sensor stacks 400, 402 are suitably mounted to first and second corners 404, 406 of the multi-head transport apparatus 122. Moreover, if additional coriolis sensors are needed, they can be mounted at any convenient location on the CMP machine, for example on corners 408 and 410 of apparatus 122.

Figure 7:
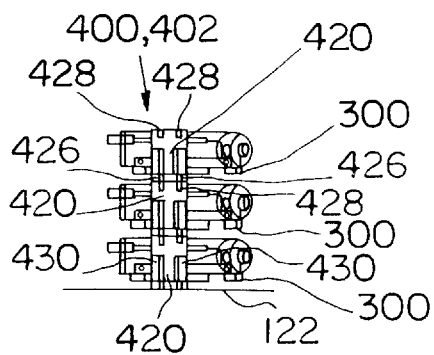
FIG. 7 is a side elevational view of three processing solution measuring devices mounted in a stacked formation.
Figure 8:
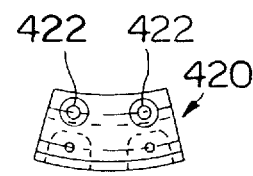
FIG. 8 is a top view of an exemplary mounting bracket for mounting the processing solution measuring devices onto the multi-head transport facility.
Figure 9:
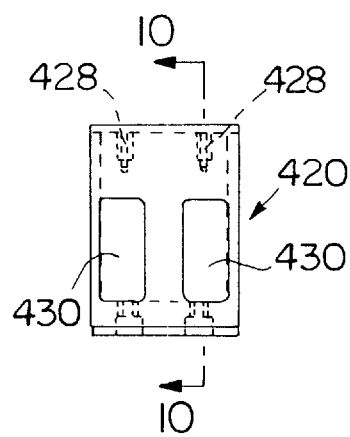
FIG. 9 is a front view of the bracket as shown in FIG. 8.
Figure 10:
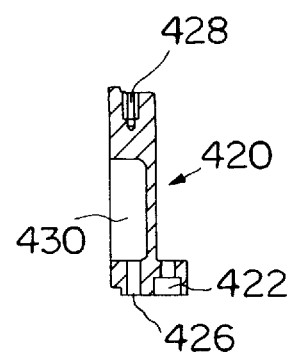
FIG. 10 is a side view of the bracket as shown in FIGS. 8 and 9.

Referring now to FIGS. 7–10, the mounting of the coriolis sensors to multi-head transport apparatus 122 will now be discussed in greater detail. In accordance with the preferred embodiment of the invention as shown in FIG. 7, coriolis sensors 300 are suitably mounted in groups of three, however, any number of meters may be stacked together at any location on the multi-head transport apparatus 122. For example, locations 404, 406, 408 and 410 of transport apparatus 122 may each include only two meters stacked together, thus accounting for a total of eight meters. Similarly, only one meter may be utilized.

In order to mount sensors 300 in stack formation, suitable vibration isolating brackets 420 are used. Preferably, brackets 420 exhibit a slightly curved shape, suitably configured to mate with the cylindrical housing 316 of the coriolis meter. To attach coriolis sensors 300 to brackets 420, suitable fasteners are inserted through holes 422 in brackets 420 and securely attached to sensors 300.

To mount the meters on top of each other, mounting brackets 420 are suitably stacked and secured to each other with mounting fasteners. In accordance with this aspect of the present invention, a bottom portion of bracket 420 is suitably configured to mate with a top portion of a second bracket 420. To secure the brackets together, fasteners are inserted through a pair of bores 426 in the bottom portion of a first bracket 420 and into a pair of bores 428 suitably located in the top portion of an adjacent second bracket 420 and axially aligned with bores 426 of the first bracket. Bracket 420 further includes a cavity 430 located in a back portion of the bracket so that the fasteners can be easily inserted through bores 426. To mount the stack assembly to multi-head transport apparatus 422, fasteners are securely mounted through bores 426 of the bottom most bracket 420 and into the multi-head transport apparatus 422.

While a preferred method of mounting the flow meters is described herein in accordance with the attached drawing FIGS. 7–10, it should be noted that the meters or sensors may be mounted at any suitable location on the CMP processing machine using any suitable mounting means. The invention set forth herein is not limited to the specified preferred mounting means.

Although the subject invention is described herein in conjunction with the appended drawing figures, it will be appreciated that the invention is not limited to the specific form shown. Various modifications in the selection and arrangement of parts, components, and processing steps may be made in the implementation of the invention. For example, although a preferred embodiment is set forth in which a coriolis mass flow meter is used to measure the flow rate of the processing solutions, it will be appreciated that virtually any meter which can adequately measure the flow rate of the solution may be employed. Moreover, virtually any type of electronic controller may be used to control the function and operation of the meter and pump assemblies. These and other modifications may be made in the design and arrangement of the various components which implement the invention without departing from the spirit and scope of the invention as set forth in the appended claims.

We claim:

1. A method for controlling an amount of slurry dispensed to a chemical mechanical polishing (CMP) system having a slurry source, a slurry dispensing system for applying the slurry from said slurry source to a polishing surface of said CMP system, a pump for transferring said slurry from said slurry source to said dispensing system, a meter for measuring an amount of said slurry dispensed to said CMP system, and a controller for controlling the operation of said pump, said method comprising the steps of:

dispensing, by said dispensing system, said slurry onto said polishing surface at a flow rate controlled by said controller;

processing a workpiece on said polishing surface; and adjusting said flow rate in response to a dynamic vibration parameter associated with said CMP system.

2. A method according to claim 1, wherein said dynamic vibration parameter comprises a vibration frequency of a component of said CMP system.

3. A method according to claim 1, wherein said dynamic vibration parameter comprises a vibration magnitude of a component of said CMP system.

4. A method according to claim 1, wherein said adjusting step is performed substantially in real-time throughout said processing step.

5. A method according to claim 1, wherein said adjusting step comprises the steps of:

detecting current processing conditions associated with said CMP system;

determining a new slurry flow rate in response to said current processing conditions; and sending a signal indicative of said new slurry flow rate to said controller.

6. A method according to claim 1, further comprising the steps of:

measuring, by said meter, an actual amount of slurry dispensed to said CMP system;

sending a signal from said meter to said controller, said signal being indicative of the measured amount of slurry dispensed to said CMP system; and monitoring said actual amount of slurry to ensure that it corresponds to an allowable tolerance range of said flow rate.

7. An apparatus for dispensing slurry to a chemical mechanical polishing (CMP) system having a polishing surface configured to process workpieces, said apparatus comprising:

a slurry dispensing system for dispensing said slurry onto said polishing surface during processing of a workpiece on said polishing surface;

a controller configured to control a flow rate of said slurry dispensed onto said polishing surface;

means for detecting a dynamic vibration parameter associated with said CMP system; and means for adjusting said flow rate in response to said dynamic vibration parameter.

8. An apparatus according to claim 7, wherein said dynamic vibration parameter comprises a vibration frequency of a component of said CMP system.

9. An apparatus according to claim 7, wherein said vibration dynamic parameter comprises a vibration magnitude of a component of said CMP system.

10. An apparatus according to claim 7, wherein said means for detecting and said means for adjusting are configured to operate in a cooperative manner such that said flow rate is adjusted substantially in real-time throughout processing of said workpiece on said polishing surface.

11. An apparatus for regulating the amount of slurry applied to a polishing surface utilized by a chemical mechanical polishing (CMP) system, said polishing surface being configured to process workpieces during a CMP procedure, said apparatus comprising:

means for detecting a dynamic vibration parameter related to said CMP procedure;

a slurry dispensing system configured to dispense a slurry onto said polishing surface during said CMP procedure;

a controller configured to adjust the flow of said slurry to a desired flow rate in response to said dynamic vibration parameter; and a slurry flow meter configured to measure a current flow rate of said slurry; wherein said controller is configured to further adjust the flow of said slurry to within an allowable tolerance range of said desired flow rate.

* * * * *